May 9, 1933.　　　　F. LEISTER　　　　1,908,295
BEARING
Original Filed May 27, 1930　　2 Sheets-Sheet 1
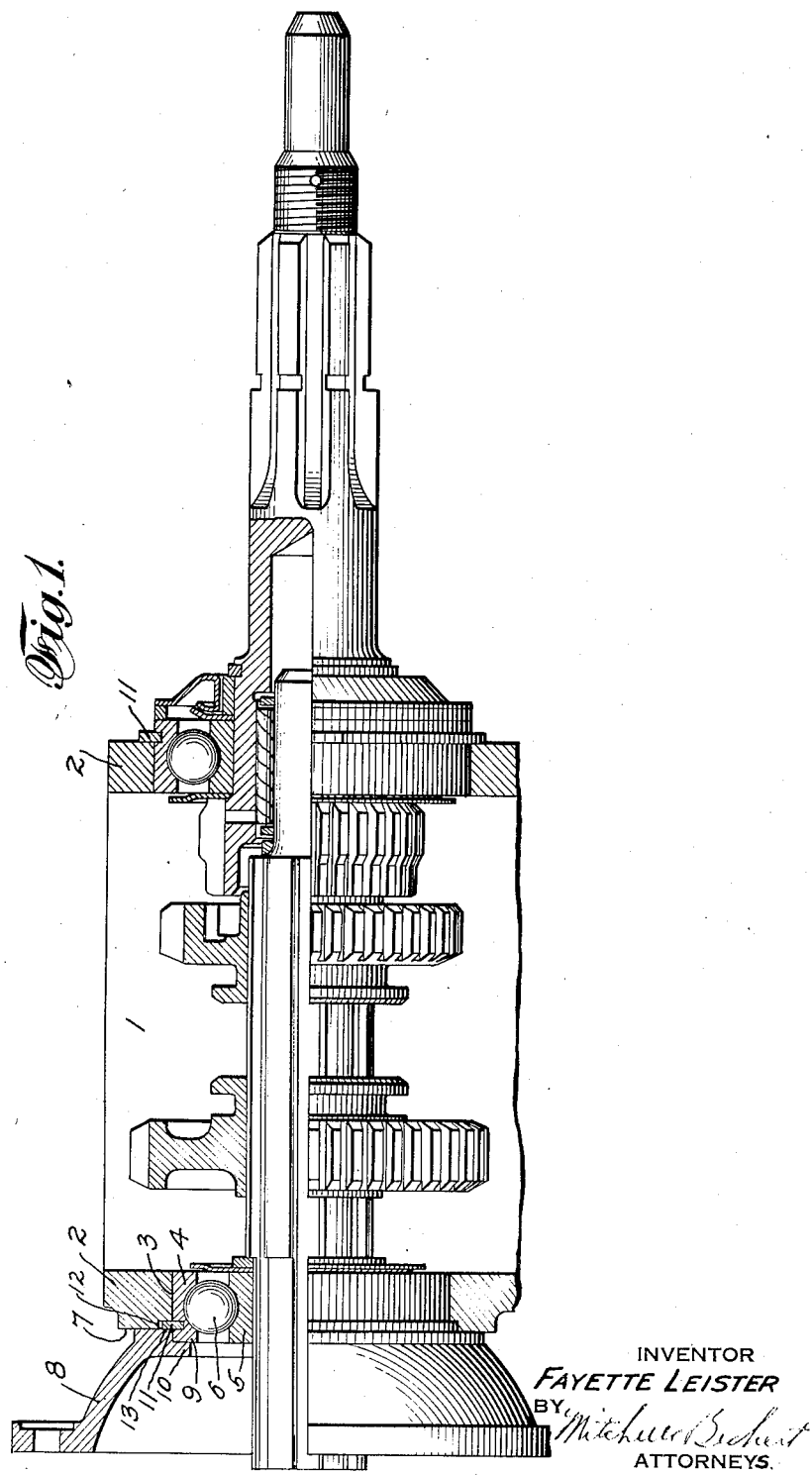
INVENTOR
FAYETTE LEISTER
BY
ATTORNEYS.

May 9, 1933.  F. LEISTER  1,908,295
BEARING
Original Filed May 27, 1930    2 Sheets-Sheet 2
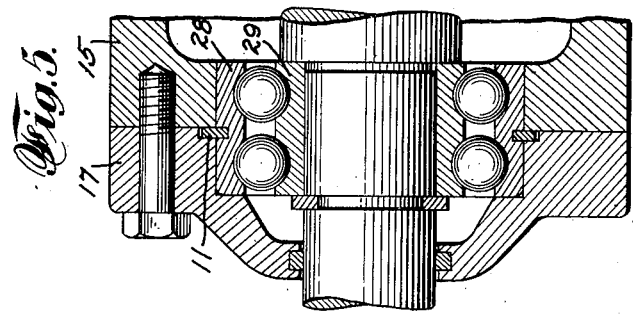
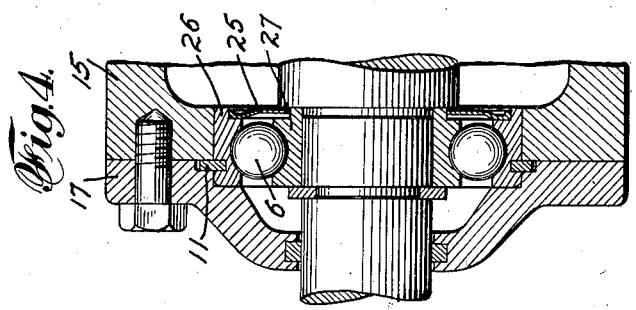
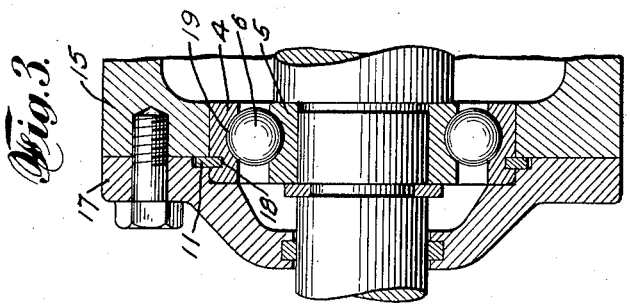
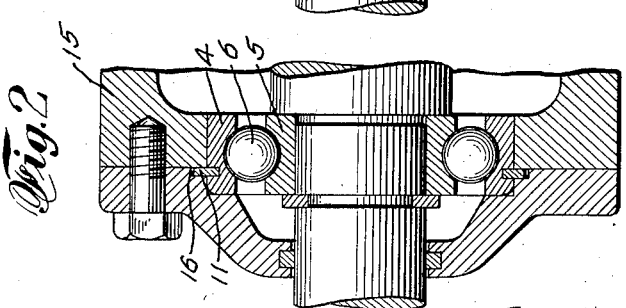
INVENTOR
FAYETTE LEISTER
BY
*Mitchell Bechert*
ATTORNEYS Patented May 9, 1933

1,908,295

UNITED STATES PATENT OFFICE

FAYETTE LEISTER, OF NEW BRITAIN, CONNECTICUT, ASSIGNOR TO THE FAFNIR BEARING COMPANY, OF NEW BRITAIN, CONNECTICUT, A CORPORATION OF CONNECTICUT

BEARING

Original application filed May 27, 1930, Serial No. 456,029. Divided and this application filed January 23, 1933. Serial No. 653,063.

My invention relates to an anti-friction bearing and more particularly to means for positioning such a bearing in an axial direction.

This application is a division of my co-pending application, Serial No. 456,029, filed May 27, 1930.

It is common practice to seat the outer ring of a bearing in a counterbore or shouldered bore in a housing member so that the bottom of the counterbore or shoulder positions the bearing ring axially in one direction. The ring is usually held against axial movement in the other direction by some means such as a second housing member or cover which abuts the ring axially, and which may be, and often is, piloted on an extended portion of the outer ring.

There are many anti-friction bearing installations in which end thrusts are relatively slight and for which reason the relatively heavy flange or shoulder at the bottom of the counterbore provides greater security against end movement of the rings than is necessary. If the bearing can be positioned axially with the proper degree of security without the relatively heavy flange at the base of the counterbore, considerable metal can be saved in a housing member carrying the bearing, and such a housing member, for example an automobile transmission casing, could be shortened by the amount of the two flanges usually employed in the two aligned bores.

It is the general object of the present invention to provide improved means forming a part of an anti-friction bearing for supporting the same against end movement.

It is a more specific object to provide an anti-friction bearing with abutment means for engaging a bearing housing member whereby the bearing may be properly seated and positioned in a straight through bore in the housing member.

It is a further object to provide an anti-friction bearing ring with an abutment surface intermediate the ends thereof whereby two housing members may be piloted on a bearing ring and the bearing ring positioned axially by said abutment member and one or both of said housing members.

Another object is to provide bearing securing means so arranged that a transmission housing or the like carrying the bearing means may be substantially shorter than is possible with bearing securing means of the prior art.

In general, the object is to provide an improved, effective and novel bearing arrangement.

In the drawings which show, for illustrative purposes only, preferred forms of the invention—

Fig. 1 is a fragmentary sectional view of a conventional automobile transmission and illustrating one form of the invention;

Fig. 2 is an illustrative or conventional view of housing members carrying an anti-friction bearing similar to that shown in Fig. 1;

Fig. 3 is a view similar to Fig. 2 but illustrating a slight modification;

Fig. 4 is a view similar to Fig. 2, but illustrating an oil guard in place;

Fig. 5 is a view similar to Fig. 2 and illustrating a double row bearing embodying one form of the invention.

The conventional automobile transmission of Fig. 1 is shown merely for the purpose of illustrating one application of the invention. In Fig. 1, 1 indicates a transmission casing having end walls 2—2 forming housing members for anti-friction bearings. Since the ends walls may be similar and serve similar purposes, a description of one end wall and corresponding bearing arrangement will suffice for both. The end wall 2 is provided with a straight bore 3 for receiving the outer ring 4 of an anti-friction bearing. It will be noted that the ring 4 terminates substantially at the inner surface of the end wall 2, and no end flange or shoulder usually employed in bearing practice is required. 5 indicates an inner ring, while 6 indicates anti-friction bearings such as balls. The bearing ring 4 extends outwardly beyond the outer surface 7 of the end wall 2, and the universal joint housing 8 is provided with a bore piloted on the extending end 9 of the bearing ring 4. As illustrated, there is a supporting flange 10 abutting one end of the ring 4, but it is to be understood this flange could be omitted and the ring 4 held against axial movement by means forming a part of my invention.

The outer ring 4 is provided with abutment means which, as illustrated, is in the form of a ring 11 snapped into or otherwise secured in a circumferential groove in the ring 4 intermediate the ends thereof. The abutment member 11 engages axially the bottom of a counterbore 12 in the end wall 2 and may be engaged axially by an abutment surface 13 on the clutch housing 8. Thus, it will be seen that the bearing ring 4 may be located in a straight bore through one or both of two detachably secured housing members and the ring positioned axially by the abutment ring 11. The ring 11 may be a split ring or may be circumferentially continuous and be applied as by dishing the same and then flattening so as to contract the bore and seat the ring in the groove.

As will be seen the gears in the transmission case are now, or when moved in gear shifting will be, positioned in close proximity to the end walls of the case. The gear case is made just long enough to contain the gearing with proper clearance and since the case, shafting, etc., need not be made longer to provide for the flange forming the bottom of the counterbore usually employed, considerable metal may be saved, the entire device lightened, and the machining operations are simplified.

Fig. 2 illustrates on a larger scale features of the invention disclosed in Fig. 1. The housing member 15 may be part of a transmission casing or other supporting means for the outer ring 4. In the form illustrated in Fig. 2, the abutment ring 11 fits in a counterbore 16 in the complementary supporting member 17 rather than in the housing 15 as illustrated in Fig. 1.

In that form of the invention shown in Fig. 3, the elements are substantially the same as those shown in Figs. 1 and 2, except that the balls 6 are arranged nearer one edge of the bearing rings than the other. The abutment ring 11 is positioned axially in substantially the same position as shown in Figs. 1 and 2, but, by reason of the offset arrangement of the balls 6, the metal between the bottom of the groove 18 carrying the ring 11 and the nearest point in the ball race 19 will be considerably greater than in the arrangement shown in Figs. 1 and 2, and the bearing ring will not be weakened.

Fig. 4 illustrates substantially the same construction as shown in Fig. 2 and illustrates a satisfactory method of sealing the bearing. As illustrated, a sheet metal disk 25 is beaded into or otherwise held in a counterbore in the outer ring 26 and extends almost up to the inner ring 27. Thus, the bearing elements and their races will be substantially sealed.

In that form shown in Fig. 5, the functions of the various parts are substantially the same as those heretofore described. The rings 28—29 are longer and are provided with two rows of bearing members such as the balls shown. The abutment ring 11 may be positioned intermediate the two rows, as shown, or outside of one row as heretofore illustrated in the previous figures.

With all forms of the invention herein illustrated, the bearing ring (in this case the outer ring) may be received in a straight through bore and the bearing ring positioned axially by improved abutment means as heretofore described. In each case there is an abutment surface intermediate the ends of the ring. The abutment surface on the ring extends from the surface in a generally radial direction and by the term "radial" I do not wish to be limited to a strictly perpendicular direction. The savings effected in each installation in the nature of the saving of metal, shortening of parts, and facility and cheapness of machining would, in production, amount to a considerable sum.

While the invention has been described in considerable detail and various modifications shown, it is to be understood that I am not limited to the exact forms illustrated nor to the details shown, since many changes may be made within the scope of the invention as defined in the appended claims.

I claim:

1. In a device of the character indicated, a housing member having a bearing surface at one end thereof and having a bore therein, an outer bearing ring fitted within said bore and having a portion which projects axially beyond one end of said housing member, the projecting portion of said bearing ring having a circumferential groove in the outer surface thereof, and an abutment member seated in said groove and having a portion which projects radially beyond the outer surface of said bearing ring, the projecting portion of said abutment member coacting with said bearing surface at one end of said housing member to limit axial motion of said bearing ring.

2. In a device of the character indicated, a housing member having a bearing surface at one end thereof and having a bore therein, an outer bearing ring fitted within said bore and having a portion which projects axially beyond one end of said housing member, the projecting portion of said bearing ring having a circumferential groove in the outer surface thereof, an abutment member seated in said groove and having a portion which projects radially beyond the outer surface of said bearing ring, and a complementary housing member secured to said first mentioned housing member, said complementary housing member holding said projecting portion of said abutment member in contact with said bearing surface at one end of said housing member so as to limit axial motion of said bearing ring.

3. In a device of the character indicated, a pair of connected housing members each having a bore therein, an anti-friction bearing ring which fits within one of said bores, said bearing ring having a circumferential groove in the outside thereof intermediate its ends, and an abutment member seated in said groove and having a portion which projects radially beyond the outer surface of said bearing ring, said projecting portion being held between said housing members to limit axial motion of said bearing ring.

4. In a device of the character indicated, a housing consisting of two parts detachably connected together and having a groove in the inner surface thereof at the parting line between said two parts, one of said parts having a cylindrical bore therein, an anti-friction bearing ring which fits within said bore and having a circumferental groove in the outside thereof, and an abutment member fitting within said two grooves for limiting axial motion of said bearing ring relative to said housing.

5. In a device of the character indicated, a pair of connected housing members each having a bore therein, an anti-friction bearing ring which fits within one of said bores and having a circumferential groove in the outside thereof in the plane of the parting line of said housing members, and an abutment member seated in said groove and held between said housing members against axial motion.

6. An anti-friction bearing comprising an inner race ring, an outer race ring, rolling members interposed between said rings, the outer ring being provided with a peripheral groove, and means positioned in said groove and carried bodily by said outer ring and extending beyond the face of said race ring adapted to prevent the axial movement of said bearing.

7. In combination, an anti-friction bearing comprising an outer bearing ring, a housing provided with a bore adapted to receive said bearing, and means for engaging said outer bearing ring with said housing consisting of a resilient split ring confined in an annular groove formed in said bearing ring and which projects therefrom into engagement with a surface on the face of said housing.

8. In combination, an anti-friction bearing comprising an outer bearing ring, a housing provided with a bore adapted to receive said bearing, and means for engaging said outer bearing ring with said housing consisting of a ring secured to a face of said housing, a resilient split ring confined in an annular groove formed in the bearing ring and which projects therefrom into engagement with a groove formed between the face of the housing and the ring secured thereto.

9. In a device of the character indicated, an anti-friction bearing comprising an inner ring, an outer ring and interposed anti-friction bearing members, said outer ring having a circumferentially extending groove in the outer surface thereof, and a split resilient ring snapped into said groove so as to be held therein and projecting beyond the outer circumferential surface of said ring, for the purpose described.

10. In a device of the character indicated, a housing for an anti-friction bearing including a bearing ring and anti-friction bearing members in engagement therewith, said bearing ring having a circumferentially extending groove therein, an abutment member in said groove to project radially from the surface of said ring to engage a part to position said ring axially in one direction, and means for positioning said ring axially in the other direction.

11. In a device of the character indicated, a bearing comprising a pair of rings with interposed anti-friction bearing members, one of said rings having a groove therein, an abutment member in said groove and projecting radially from the grooved surface of said ring, means engaging one side of said abutment member to position said grooved ring axially in one direction, and means engaging one of said rings for positioning said grooved ring axially in the opposite direction.

12. In a device of the character indicated, a pair of detachably secured members, an anti-friction bearing including a bearing ring having a circumferentially extending groove therein, an abutment member in said groove and extending radially beyond the grooved surface of said ring, said abutment member extending between and being held by said detachably secured members.

13. In a device of the character indicated, a housing consisting of two parts detachably connected together and having a recess substantially at the parting line between said two parts, one of said parts having a cylindrical bore therein, an anti-friction bearing ring which fits within said bore and having a recess therein, and an abutment member which fits into said two recesses for limiting axial motion of said bearing ring relative to said housing.

14. In a device of the character indicated, an anti-friction bearing ring, anti-friction bearing members engaging said bearing ring, said bearing ring having a narrow circumferentially extending groove, and an abutment member seated in said groove and carried bodily by said ring to position said bearing ring in an axial direction.

15. In a device of the character indicated, an outer bearing ring, an inner bearing ring, said rings having opposed raceways therein, and balls in said raceways, said outer ring having a narrow circumferentially extending groove in the outer surface thereof for the reception of a positioning member to position said ring in an axial direction, a positioning member in said groove and carried bodily by said outer ring, said groove being located axially to one side of the bottom of the raceway in said ring.

16. In a transmission, a transmission case, said case having a bore through each end, gear mechanism in said case, said gear mechanism comprising gears positioned at least at times in close proximity to the inner end walls of said case, an anti-friction bearing comprising an inner and an outer bearing ring with interposed anti-friction bearing members mounted in each said bore, said outer rings being substantially flush with the inner walls of said case, each said outer ring having a circumferential groove therein intermediate the ends thereof, and an abutment member in each said groove and abutting a part of said case to position said bearings axially, said gear mechanism being supported at least in part by said anti-friction bearings.

17. In a device of the character indicated, a housing having a bore therein, an outer ring of an anti-friction bearing within said bore, said outer ring having a circumferentially extending groove in the outer surface thereof, an abutment member in said groove and projecting beyond the surface of said ring, said abutment member being in engagement with a part of said housing adjacent said bore to position said ring axially in one direction, and means secured to said housing and engaging said outer ring to position the same axially in the opposite direction.

18. In a device of the character indicated, a pair of connected housing members each having a bore therein, an anti-friction bearing ring fitting within both of said bores to pilot said housing members relatively to each other, said bearing ring having a circumferentially extending groove therein, an abutment means seated in said groove and engaging a part of at least one of said housing members for positioning said ring axially in said bores.

19. In a transmission, a transmission case, said case having a bore through one end, gear mechanism in said case, said gear mechanism including a gear positioned at least at times in close proximity to the inner end wall of said case adjacent said bore, an anti-friction bearing comprising an inner and an outer bearing ring with interposed anti-friction bearing members mounted in said bore, said outer ring being substantially flush with the inner wall of said case, said outer ring having a circumferential groove therein, and an abutment member in said groove and abutting a part of said case to position said bearing axially in at least one direction, a part of said gear mechanism being supported at least in part by said anti-friction bearing.

FAYETTE LEISTER.